Figure 1:
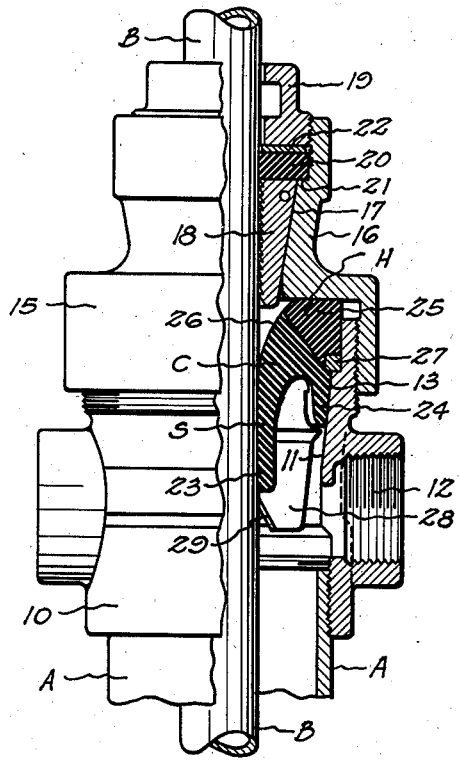

Aug. 12, 1941.   S. P. TSCHAPPAT   2,252,240
PACKING DEVICE
Filed March 16, 1939   2 Sheets-Sheet 1

Inventor
Sheridan P. Tschappat
By Jack A. Ashley
Attorney

Aug. 12, 1941.　　　S. P. TSCHAPPAT　　　2,252,240
PACKING DEVICE
Filed March 16, 1939　　　2 Sheets-Sheet 2

Inventor
Sheridan P. Tschappat
By Jack A. Ashley
Attorney

Patented Aug. 12, 1941

2,252,240

UNITED STATES PATENT OFFICE 2,252,240

PACKING DEVICE

Sheridan P. Tschappat, Tulsa, Okla.

Application March 16, 1939, Serial No. 262,104

6 Claims. (Cl. 288—5)

This invention relates to new and useful improvements in packing devices.

One object of the invention is to provide an improved packing device for efficiently packing off around a pipe, or other cylindrical element and being constructed so as to permit the passage of the pipe couplings, or other exterior projections on the pipe string while maintaining the seal around said pipe string.

An important object of the invention is to provide an improved elastic packing member arranged to be mounted in a packing device through which a pipe, or other element extends, said member being adapted to be distorted into sealing position to seal off the annular space between the pipe and the device by a pressure from below, whereby mechanical means for distorting the member is unnecessary.

Another object of the invention is to provide an improved elastic packing member for packing off around a well tubing, or other pipe string which includes an inner annular apron or lip for engaging the tubing and an outer annular lip for engaging the housing within which the member is mounted so as to pack off between these parts, the member being reinforced by radially disposed ribs which extend between the sealing lips and which are partially disconnected from the outer lip, whereby said outer lip may undergo a limited outward movement with relation to the inner lip to assure positive sealing at all times.

A further object of the invention is to provide an improved packing member including spaced, inner and outer, annular sealing elements which are reinforced by radially extending ribs, which ribs have their lower end terminating in a plane below the lower end of the inner sealing element, whereby said ribs not only reinforce the packing member and hold the sealing elements in sealing position, as well as preventing said elements from being turned inside out, but also function as a guide means for guiding a pipe, tubing, or the like into the inner, annular sealing element, whereby excessive wear on the packing member is reduced and the life thereof increased.

A particular object of the invention is to provide an improved packing member, of the character described, wherein the sealing elements thereof are constructed of a relatively soft material so as to be readily deformable into sealing position; that portion of the member above said sealing elements, which acts as a support for the packing member within the housing of a packing device, being constructed of a relatively hard elastic material, whereby the sealing elements are reinforced and prevented from being distorted beyond their elastic limits, and also whereby the life of the packing member is materially increased.

A construction designed to carry out the invention will be hereinafter described, together with other features of the invention.

Figure 2:
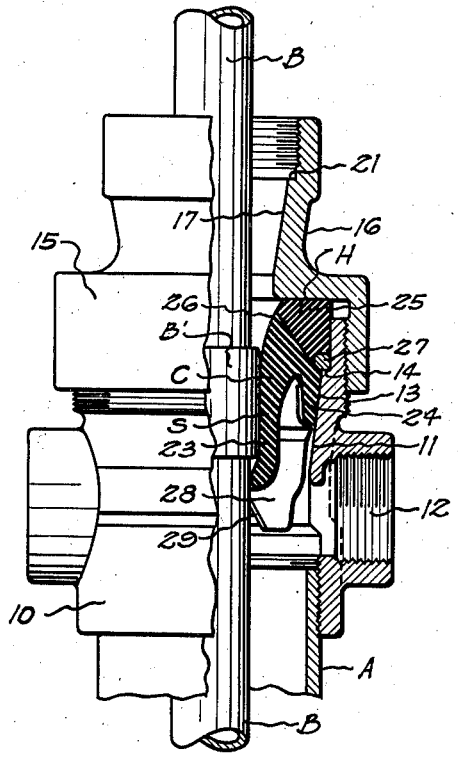
Figure 3:
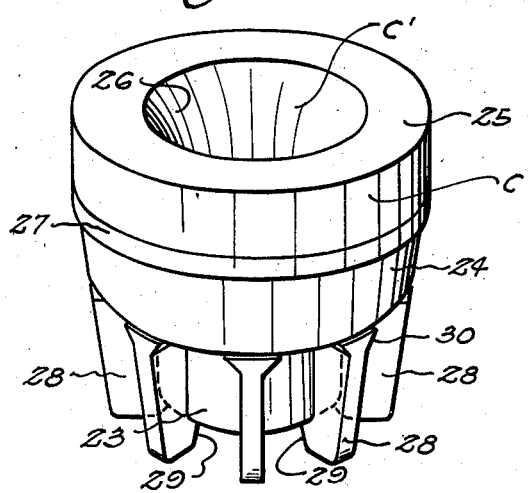
Figure 5:
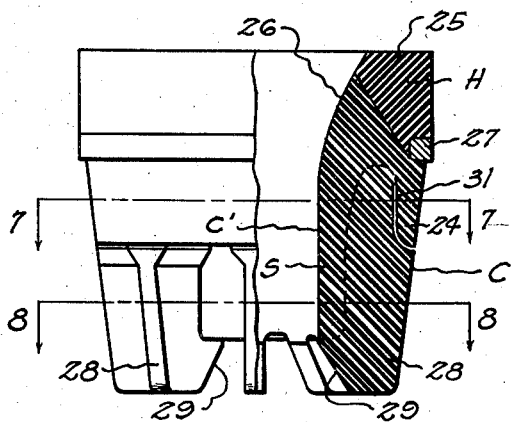
Figure 6:
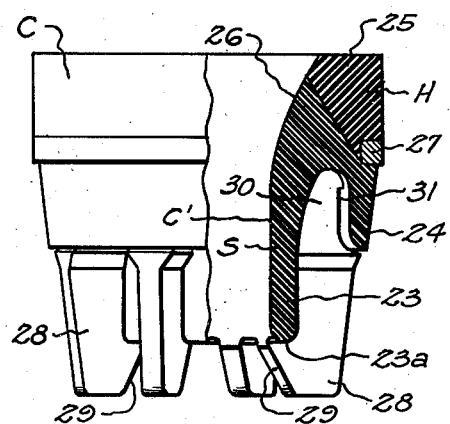
Figure 7:
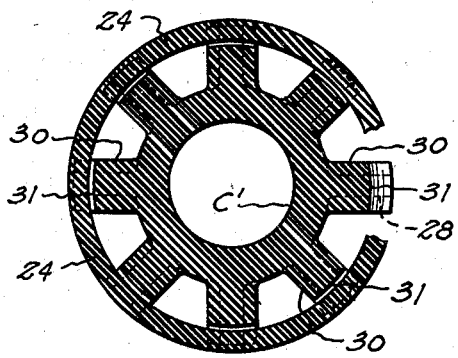
Figure 8:
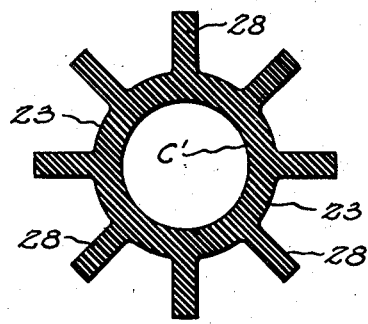
Figure 4:
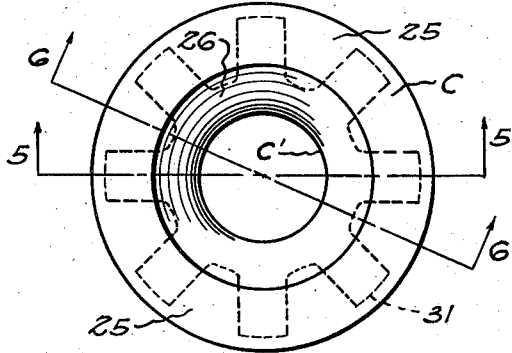

The invention will be more readily understood from a reading of the following specification and by reference to the accompanying drawings, in which an example of the invention is shown, and wherein:

Figure 1 is a view, partly in section and partly in elevation, of a packing device, constructed in accordance with the invention, and showing the same supporting a well tubing, Figure 2 is a similar view, illustrating the tubing being moved through the device, Figure 3 is an isometric view of the improved packing member constructed in accordance with the invention, Figure 4 is a plan view, Figure 5 is a view, partly in section and partly in elevation, of said rubber, taken on the line 5—5 of Figure 4, Figure 6 is a view, similar to Figure 5, taken on the line 6—6 of Figure 4, Figure 7 is a horizontal, cross-sectional view, taken on the line 7—7 of Figure 5, and Figure 8 is a horizontal, cross-sectional view, taken on the line 8—8 of Figure 5.

In the drawings, the numeral 10 designates the body of a tubing or casing head which has an axial bore 11 extending therethrough. The lower end of the bore is screw-threaded to permit the body to be mounted on a well casing A, or other support. Radially extending outlet ports 12 which are adapted to receive outlet pipes (not shown) are provided in the wall of the body and communicate with the bore thereof. The upper portion of the bore is flared outwardly to form an annular, inclined seat 13 within said body and immediately above the seat, an internal, annular shoulder 14 is provided. The shoulder is located in a plane below the top of the body and the wall of the bore above said shoulder is substantially vertical.

The upper end of the body is externally screw-threaded and is adapted to receive a flanged cap or retaining member 15. This member has a slip supporting bowl 16 made integral therewith and is clearly shown in Figures 1 and 2, the bowl extends axially and upwardly from said cap member. The bore of the bowl has a diameter less than the bore of the body and is inclined to provide an inclined seating surface 17, whereby the usual pipe supporting slips 18 may be mounted therein. A well tubing, pipe or other element B may extend axially through the bowl and body and, manifestly, the usual teeth on the inner surface of the slips 18 engage said tubing to support the same. The provision of the inclined seat 17 permits the slips to be wedged between said seat and the outer surface of the tubing, whereby said tubing is suspended from the slips in the usual manner. When the well tubing is supported by the slips, it will be obvious that the underside of the cap or retaining member 15 overlies the annular space between the tubing and the bore of the body 10.

The slips 18 may be retained in the bowl by any suitable means, but it is preferable to internally screw-thread the upper end of the bore of the bowl above the seat 17, whereby an annular retaining gland or plug 19 may be mounted therein. In order to pack off the annular space between the tubing and bowl, an annular elastic packing ring 20 surrounds the tubing and has its outer peripheral portion resting on a shoulder 21 provided for the purpose and disposed immediately above the seat 17. The packing ring has its inner periphery contacting the outer surface of the tubing with its outer periphery engaging the wall of the bore of the bowl so as to pack off the annular space around the tubing. A metallic follower ring 22 is interposed between the packing ring and the underside of the gland 19 and, with this arrangement, tightening of the gland distorts and holds the packing ring in a sealing position. Also, the provision of the gland prevents the slips 18 from being forced or blown upwardly from the bowl by a pressure from below. It is pointed out that the particular means for supporting the well tubing B forms no part of the present invention, being described merely for the sake of clarity. This means is, therefore, subject to variation.

For packing off the annular space between the well tubing B and the bore of the body above the outlet ports 12 so as to prevent an escape of the well pressure upwardly from the well casing A, and also to provide a stripper for stripping fluid from the outer surface of the well tubing when the same is being removed from the well, an annular packing member C is arranged to be mounted in the bore of the body 10. The member is constructed of rubber, rubber compound, or other suitable elastic material and includes an inner annular sealing apron or lip 23 which is relatively elongate in a vertical plane, and which is arranged to contact or engage the outer surface of the tubing B which extends through the bore of said apron. An outer, annular sealing lip 24 which is shorter in vertical length than the apron is spaced from said apron and is adapted to engage the inclined seating surface 13 in the bore of the body. The upper ends of the sealing apron and lip are connected by a ring or backing portion 25 which is made integral therewith and which is also constructed of an elastic packing material. Thus, the spaced, inner and outer sealing elements connected at their upper ends by the ring or backing portion form the packing member C having an axial bore C'. The upper end of this bore is flared or curved outwardly, as shown at 26, whereby when the well tubing is lowered into the packing member, said tubing is guided into the bore thereof.

The outer periphery of the outer sealing lip 24 is inclined slightly to conform to the incline of the seating surface 13 of the bore and immediately above this inclined portion, a metallic seating ring 27 is embedded, or otherwise secured in the outer surface of the packing member. As is clearly shown in Figures 1 and 2, when the lip 24 is engaging the inclined surface 13 of the bore, the outer portion of the underside of this ring is arranged to engage or seat upon the internal shoulder 14 within the bore of the body, whereby said ring provides a rigid support for the packing member. Above the metallic ring, the outer surface of the packing member C is substantially vertical so as to engage the straight wall of the bore 11 above the shoulder 14.

When the packing member C is in position within the body 10, with the tubing B extending through its bore C', the inner, elongate sealing lip or apron 23 engages the outer surface of the tubing, with the outer lip 24 engaging the surface 13 of the bore of the body. The packing member is supported on the shoulder 14 and the periphery of the member above the shoulder contacts the wall of the bore. Upward displacement of the packing member is prevented by the engagement of the underside of the cap or retaining member 15 with the top of the packing member. Manifestly, the well pressure in the casing A is acting upwardly against the packing member and this pressure urges the sealing elements outwardly from each other, spreading the same and forcing them into intimate contact with the well tubing B and the wall of the bore 11, whereby a positive seal is effected between the tubing and body. The upward pressure against the packing member also forces the same upwardly whereby the top of the member is urged against the retaining cap or member 15 which has been screwed down onto the body sufficiently to hold the metallic ring 27 on the shoulder 14.

From the foregoing, it will be seen that the sealing elements 23 and 24 provide the seal, while the upper portion of the member, which is the backing or ring portion 25, sustains or bears the pressure acting from below. Thus, it is desirable that the sealing elements be of a relatively soft, elastic material, such as a high tensile rubber, so that said elements are flexible and readily distortable; however, since the backing portion or ring sustains the wear and acts as a support, it is desirable that this portion be of a relatively hard, elastic material so as to be capable of longer wear. For this reason, the upper portion, and particularly the outer corner, of the backing or ring 25 is formed of a hard rubber, as indicated by the letter H. As illustrated, this hardened portion extends from a point below the metallic ring 27 transversely at an incline to the bore C' of the packing member. If desired, the entire backing 25 could be of the harder material. The remainder of the member, and particularly the sealing elements 23 and 24, is made of a softer elastic material, as indicated by the letter S, whereby they are flexible and readily distortable so as to assure a positive sealing engagement with the tubing and body. Thus, the sealing elements of the packing member which perform the sealing are of a more pliable material than the backing portion which sustains the wear. In this manner, the life of the packing member is materially increased since the wearing surfaces are of the relatively hard material capable of longer wear.

For reinforcing the annular, flexible sealing elements 23 and 24, a plurality of reinforcing ribs 28 extend radially of the annular space between said sealing elements. Each rib is made integral with the inner sealing apron or element, being of the same elastic material and the lower end of each rib projects below the lower end of said inner sealing apron. As is clearly shown in Figures 1, 2, 5 and 6, the inner portion of the lower end of each rib is inclined or bevelled, as indicated at 29, such bevel merging into the bore C' of the packing member adjacent the lower end of the sealing apron 23. The outer vertical surface of the rib is tapered or inclined so as to form a continuation of the inclined surface of the sealing lip 24 (Figure 5), whereby the outer surfaces of the ribs contact or engage the inclined surface 13 of the bore of the bowl. The upper end of each rib, or that portion between the sealing lip 24 and sealing apron 23, is widened transversely, as indicated at 30 in Figure 3 so as to impart increased strength to this portion of the rib. The upper end of each rib which extends contiguous to the inner vertical face of the shorter sealing lip 24 is disconnected therefrom, whereby a narrow slot 31 is formed between said rib and said lip. Thus, the lip 24 is free to move independently of the ribs and also independently of the inner annular sealing apron 23 to which the ribs are attached throughout their vertical length. Thus, the inner sealing apron may follow the contour of the tubing and may move radially as the couplings B', or other projections on said tubing, pass therethrough without affecting the sealing engagement of the outer lip 24 with the bore of the body.

From the foregoing, it will be seen that a most efficient packing member is provided. The member may readily be inserted within the body, after which the cap or retaining member 15 is screwed onto the body. The well tubing may then be run into the well casing through the packing member C, as is shown in Figure 2, said tubing being guided into the bore of the member by the curved or flared upper end 26 of the bore. The pressure below the member acting upwardly against the member spreads the annular sealing elements 23 and 24, whereby said elements tightly engage the tubing and bore of the body to effect a positive seal. Since these elements are of a flexible, elastic material, efficient sealing is assured. As a coupling B', or other projection, on the tubing enters the annular sealing apron or element 23, said apron is forced outwardly, as shown in Figure 2, but since the apron and ribs 28 attached thereto, are not positively connected to the outer sealing lip, such movement of the apron does not effect the seal between said lip and the bore of the body. The apron 23, being constructed of relatively soft elastic material, follows the contour of the coupling B' and maintains a positive seal therewith as the coupling moves therethrough. After the tubing has been run into the well, the slips 18 are dropped into the bowl and the packing ring 20 and gland 19, both of which are preferably split, are inserted into the upper end of said bowl to retain the slips and prevent upward displacement thereof. Manifestly, the pressure acting upwardly against the packing member C maintains the sealing elements 23 and 24 in their sealing positions. The backing portion or ring 25, which is of a hardened material as compared to the material of which the sealing elements are constructed, sustains the pressure acting against the member and reinforces the sealing elements.

When it is desired to remove the tubing, it is only necessary to remove the slips and move said tubing upwardly through the packing member. During such movement, the couplings B' on the tubing or guided into the bore of the packing member C by the bevelled lower ends 29 of the ribs 28 and, therefore, said couplings do not strike the lower end of the inner sealing element. If desired, this lower end of said sealing element may be rounded, as indicated at 23a, to eliminate sharp corners and further aid in guiding the tubing through the member. The radial ribs not only act as a guide means but also serve to reinforce the sealing elements for, obviously, said ribs prevent the sealing elements from being turned inside out by an excessive pressure from below during raising of the tubing. Although the ribs 28 have been illustrated as constructed of a relatively soft elastic material, as are the sealing elements, these ribs could be of a relatively hard elastic material, such as the material of which the backing portion or ring 25 is constructed.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A packing device including, a body through which a well tubing extends, an elastic packing member mounted within the bore of the body for sealing off the annular space between the body and tubing, said member including a ring portion having depending inner and outer annular sealing elements which are spaced from each other and which are arranged to engage said tubing and body to effect a seal with these parts, and a plurality of radially disposed ribs extending between and attached to one of the sealing elements for reinforcing and bracing said elements, each rib having its lower end projecting below the lower end of the sealing elements and having its inner edge bevelled inwardly, whereby said ribs act to guide the well tubing into the inner sealing member.

2. An annular elastic packing member including, a ring portion, an annular elongate sealing element depending from the inner periphery of the ring portion, an annular sealing lip depending from the outer periphery of said ring portion, and a plurality of radially disposed ribs connected to the element and extending between the lip and said element for reinforcing and bracing the sealing element and lip, each rib having its lower end terminating in a plane below the lower end of the sealing element whereby said ribs act to guide a cylindrical pipe member into the sealing element.

3. An annular elastic packing member including, a ring portion, an annular elongate sealing element depending from the ring portion, an annular sealing lip depending from the outer annular portion of the sealing element, and a plurality of radially disposed ribs directly between the sealing element and the lip for reinforcing and bracing the sealing element and lip, each rib being attached to the sealing element and to the underside of the ring portion and being free from the sealing lip, whereby said lip is capable of a limited movement with relation to the sealing element.

4. An annular elastic packing member including, a ring portion, an annular elongate sealing element depending from the inner periphery of the ring portion, an annular sealing lip depending from the outer periphery of said ring portion, and a plurality of radially disposed ribs between the lips for reinforcing and bracing the sealing element and lip, each rib being attached to the sealing element and to the underside of the ring portion and being free from the sealing lip, whereby said lip is capable of a limited movement with relation to the sealing element, the lower end of each rib terminating in a plane below the lower end of the sealing element, whereby said ribs act as a guide for guiding a pipe element into the sealing element.

5. A packing device including, a cylindrical body having an axial bore therethrough for the passage of an axial member, said body having upright radial ribs attached to and disposed around its lower portion, and an annular lip overhanging said ribs and free therefrom to be expanded into sealing position by the well fluid.

6. In a packing device, the combination of an annular elastic packing member including an upper ring portion, an annular elongate sealing element depending from the ring portion, an annular sealing lip depending from the outer periphery of said sealing element spaced from said sealing element, the sealing element and lip being constructed of a relatively soft elastic material so as to be freely flexible, while the ring portion is constructed of a relatively hard elastic material so as to have increased wearing qualities, and a plurality of radially disposed ribs carried by the sealing element between the lip and sealing element for reenforcing and bracing the sealing element and lip, each rib having its lower end terminating in a plane below the lower end of the sealing element whereby said ribs act to guide a cylindrical pipe member into the sealing element, the sealing lip being free from the ribs so as to expand away therefrom.

SHERIDAN P. TSCHAPPAT.